Figure 1:
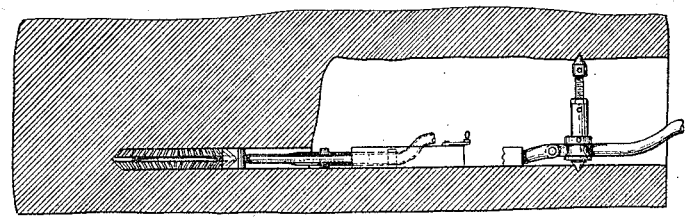

I. BEISSEL.
CUTTING MACHINE.
APPLICATION FILED JUNE 1, 1910.

1,000,959.

Patented Aug. 15, 1911.

Witnesses:

Inventor:
Ignaz Beissel
Attorney.

UNITED STATES PATENT OFFICE.

IGNAZ BEISSEL, OF AIX-LA-CHAPELLE, GERMANY.

CUTTING-MACHINE.

1,000,959.  Specification of Letters Patent.  Patented Aug. 15, 1911.

Application filed June 1, 1910. Serial No. 564,477.

*To all whom it may concern:*

Be it known that I, IGNAZ BEISSEL, mining assessor, a subject of the King of Prussia, residing at No. 18 Kleinkölnstrasse, Aix-la-Chapelle, in the Kingdom of Prussia, Empire of Germany, have invented certain new and useful Improvements in Cutting-Machines; and I do hereby declare the following to be a full, clear, and exact description of the invention, such as will enable others skilled in the art to which it appertains to make and use the same.

This invention relates to machines for cutting coal and other mineral, in which the rotary cutting wheels are directly driven by a motor-device similar to a turbine.

What I have invented to improve such machines is the arrangement of motor-devices within the rotary cutting-disks, these being hollow, whereby the pressing-medium is guided through the nave of the stationary parts of the driving-devices to the cutting disks, these forming the rotary parts of the driving-devices. By this arrangement the following advantages over what is known heretofore are gained. (1.) In a cutting-wheel of certain height there are obtained for the pressing-medium the greatest pressure-surfaces imaginable which, in their turn, cause an increased capacity of the cutting-machine. (2.) By the formation of the two cutting wheels as hollow disks, guided by the stationary parts forming a double-wheel, each single cutting disk receives the form of an independent radial-turbine so that in the case of opposite rotations the transverse strains compensate each other. (3.) The form of the cutting disks as hollow-disks allows of giving to the journals a diameter as small as possible so that the weight of the machine is reduced and the construction is simpler at the same time. (4.) By the directrix-wheel being a double wheel, the giving-off of power to the cutting disks can take place as close as possible to the cutting-face by means of a pressure-turbine thereby being attained an economical driving. (5.) Owing to the fact that the pressing medium enters into the cutting-disks through the nave of the stationary directrix wheel, the proportion between the circumference of the rotor, that is to say the working-face of the machine, on one side and the inside width of the feeding-pipe on the other can be made most favorable. (6.) The compulsory guidance of the pressing medium through the directrix-wheel forming a double wheel and through the rotors allows the pressing medium, especially if water under pressure is used, to leave the rotors that is to say the cutting disks immediately before the cutting-teeth and that in the direction opposite to the rotation. In this way a proper cooling of the cutting-teeth, a direct watering of these cutting-teeth and of the holing is attained. Further the formation of coal-dust and sparks is prevented thereby.

As my improved cutting-machine can be manufactured in any size, especially as a hand-machine of light weight, so that it can be easily handled by a workman, the purposes of mining are mostly taken into account.

The present instance as illustrated in the accompanying drawings represents a simple form of construction of my new cutting-machine.

Figure 2:
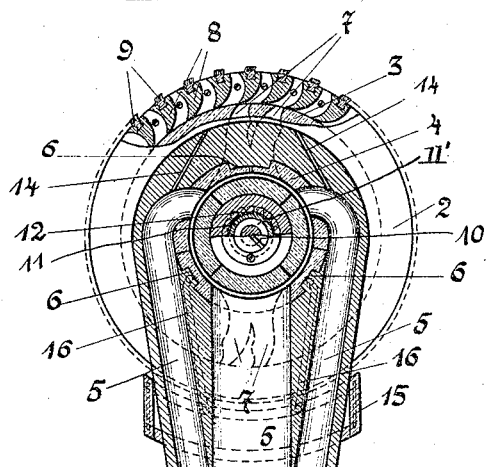
Figure 3:
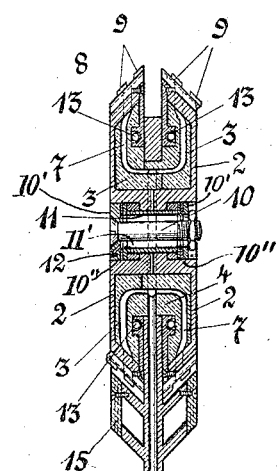
Figure 4:
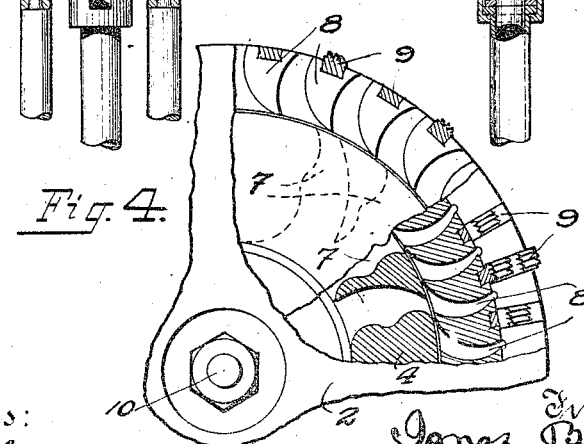

Figure 1 shows a seam in section with a working cutting-machine in side elevation. Fig. 2 is a horizontal section through the center of the cutting-wheel. Fig. 3 is a vertical section of Fig. 2. Fig. 4 is an enlarged fragmentary elevation, showing a portion of the cutting members broken away and in section to bring out details of construction, a modification of my invention.

The illustrated machine forms a radial double turbine. At both sides of the feed-tube 1 for the pressure-medium the rotors 2 are arranged. The feed-tube, close to the machine, is flat. The directrix-wheel 3 is arranged inside of the rotors, said directrix-wheel being stationary and having the form of a double wheel. Its hollow nave 4 is held by the feed-tube 1 and communicates through canals 5 with it. The directrix-wheel is preferably composed of two separate wheels engaging each other by means of nave-parts forming gearings. To prevent the directrix-wheel 3 from turning out of place toward the feed-tube 1 the attachments 6 on the latter are provided to enter the nave of the directrix-wheel. The channels 7 in the directrix-wheel lead from the hollow nave to the peripheries and form near to the peripheries the "directrix-blades". The position of the blades 8 of the rotors is clearly shown in Fig. 2. Instead of arranging only the few illustrated channels 7 whole the peripehries of the directrix-wheels can be provided with directrix-blades of course. The number and form of them depends on the condition of the pressing medium at disposal. Teeth 9, the holing parts of the machine, are preferably formed as wedge-shaped cutters. They are to be placed in groups, displaced to each other, into the blades of the rotors. They may also be arranged on a chain passing around the rotary cutting-wheels.

The shape of the blades of the rotors is in particular to be such that they form a pressure-turbine and that if water is used, let the latter pass out backward. This form of construction of the blades makes it possible to use the water on one hand for cooling and washing the cutting teeth and on the other for rapidly removing the cut material.

The connection of the two halves of the directrix-wheel 3 as well as those of the rotors 2 surrounding the same is effected by the bolt 10. The latter is introduced, after the single halves consisting each of a directrix-wheel and a rotor, have been placed upon the feed-tube 1, and it thus forms, at the same time, the connection between the feed-tube 1 and the halves of the directrix-wheel 3. All parts to be connected by means of bolt 10 may be such that the two halves of the coal-cutting-machine rotate in the same direction or also in opposite directions. In Fig. 2, the device is shown to operate with the cutting members rotating in the same direction, while, in Fig. 4, the cutting members are adapted to rotate in opposite directions. This difference in rotation is accomplished by the direction of inclination, with respect to the plane of the members, of the coöperating channels 7 and 8, as clearly shown in the drawings. In each one of these cases they can either rotate independently of each other, or they may be in connection with one another and rotate in the same direction.

In the form of construction indicated the rotors 2 are independent. The bolt 10 presses two disks 10', between which three lies a packing 10'', against the piece 11 of tube 1. The space remaining between the bolt 10 and the piece 11 of tube 1 serves as an oil-reservoir 11' for the roller bearings 12 by means of which and of roller-bearings 13 the rotors run over the stationary parts.

In order to be able to wash the slot between the cutting-wheels, the flat end-piece of feed-tube 1 is provided with jet-openings 14.

In detail the course of the pressure medium of the machine is as follows: The pressure medium enters into the tube 1 and by means of a bifurcation it passes through the openings 5 into the directrix-wheel 3. From this it streams through the directrix-blades 7 against the blades 8 of the rotors, which are thereby put into rotation. If, in particular water is used as pressure-medium, it passes through the rotary-blades 8 and at the periphery of the rotors it passes out cleaning and cooling the cutting teeth by a stream in opposite direction, after having put the rotors in rotation and given off its power.

For the protection of the attendant there may be arranged in front of the back of the cutting wheels 2 a protecting-screen 15, which is to be of the height of the cutting wheels and forms a protecting closure when the coal cutting machine has entered the hole. In the form of construction indicated the protecting screen further forms an oil-reservoir for the ball-bearings. The lubrication takes place through the canals 16 which are arranged in the frame and have their continuation in canals of the nave of the directrix-wheel 3. For handling this screen is arranged at the end of a frame the length of which can be varied and which is to be flat in a manner that it can be introduced into the hole and serve to the cutting wheel as a guide. The cutting machine is taken at the cutting place and pressed against the same, while the pressure-medium streams through the feed-tube and puts the cutting-wheels into rapid rotation. The cut material loosened by the cutting teeth is washed away by the pressure-medium, and if water or steam is used as a pressure medium, the same is partly or fully absorbed by the cut material. In this way there are produced two strips of the thickness of the two cutting wheels. The coal strip theoretically remaining between the two strips of a thickness of about 10 mm. of the slot of the cutting-wheel will break off in consequence of the shocks produced by the movement of the cutting-wheel as well as in consequence of the brittleness of the cut, met with in most cases, so that on the whole there is formed a cut of the height of the cutting-wheel.

If the cutting-machine has cut itself into the hole, the following frame which can be lengthened as required serves it as a guide. If the two cutting-wheels run in opposite directions the power required for holding the cutting-machine is smaller than with cutting-wheels running in the same direction, as in this case the pushing forces occurring in consequence of the resistance of the cutting surfaces compensate each other for the greater part.

When using pressure-air or electricity for driving the cutting-wheels there may be arranged a special washing device for conveying off the cut material and for avoiding the formation of coal-dust and sparks.

I claim:—

1. A cutting machine comprising, a hub provided with a radial extension, disk members, provided with cutting edges, rotatably mounted upon said hub and independently of each other, means holding said disk members in operative relation to each other and to said hub, and means for imparting rotation to said disk members, combined substantially as described.

2. A cutting machine comprising, an annular member provided with a radial extension having a conduit way communicating with the annular member and open therefrom, bushings secured to said annular member, hollow disk members, provided with channels communicating with the interior and peripheral exterior thereof, revolubly mounted on said bushings and concentrically with respect to each other and to said annular member, cutting members carried by said disk members adjacent to the said openings in the periphery thereof, and means holding said disk members and bushings in operative relation to each other, said bushings being provided with fluid pulsating means adapted to rotate said disk members independently of each other, combined substantially as described.

3. A cutting machine comprising, an annular member provided with a radial extension having a conduit way communicating with the annular member and open therefrom, bushings secured to said annular member, hollow disk members provided with channels communicating with the interior and peripheral exterior thereof, revolubly mounted on said bushings and concentrically with respect to each other and to said annular member, cutting members carried by said disk members adjacent to the said openings in the periphery thereof, and means holding said disk members and bushings in operative relation to each other, said bushings being provided with fluid pulsating means adapted to rotate said disk members in opposite directions, combined substantially as described.

In testimony whereof I have signed my name to this specification in the presence of two subscribing witnesses.

IGNAZ BEISSEL.

Witnesses:
  MORITZ WEERTH,
  HENRY ARODPIEG.